April 9, 1957  J. H. BACH  2,787,938
ROCKET TUBE EXHAUST
Filed Aug. 8, 1952  2 Sheets-Sheet 2

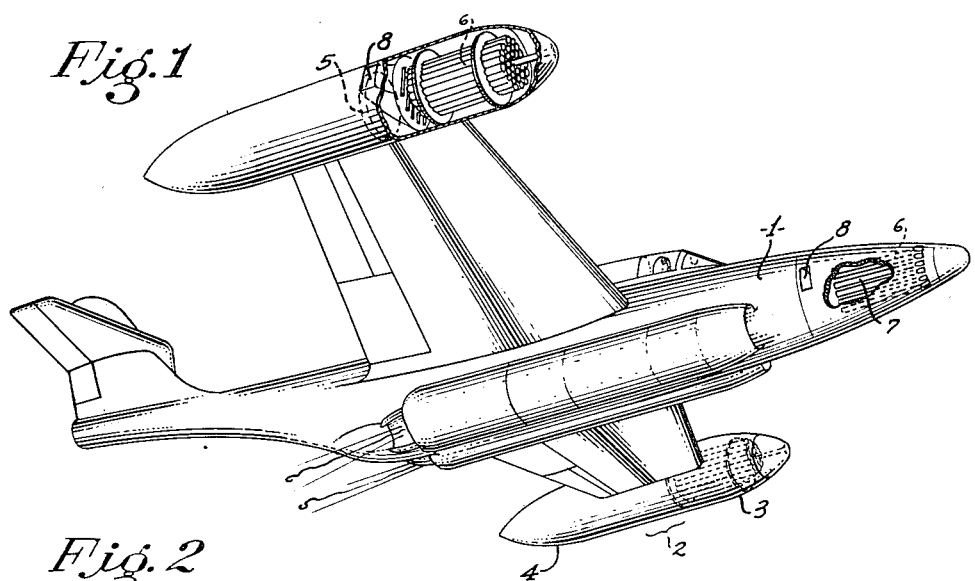
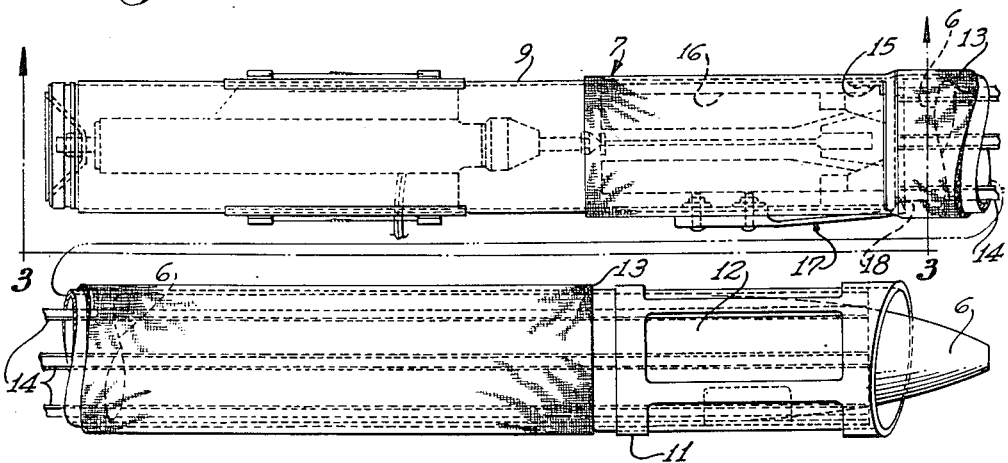
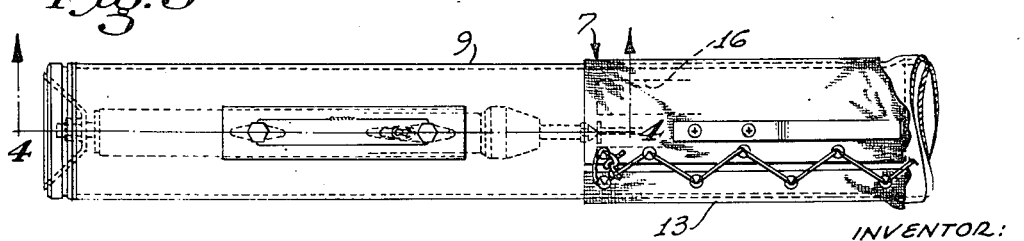

Before Detonation

Instant After Detonation

INVENTOR:
JOHN H. BACH

By Herbert E. Metcalf
HIS PATENT ATTORNEY

United States Patent Office 2,787,938
Patented Apr. 9, 1957

2,787,938
ROCKET TUBE EXHAUST

John H. Bach, Hermosa Beach, Calif., assignor to Northrop Aircraft, Inc., Hawthorne, Calif., a corporation of California Application August 8, 1952, Serial No. 303,215

1 Claim. (Cl. 89—1.7)

This invention relates to rocket launching devices and more particularly to valve means closing the aft end of a rocket launching tube except when a rocket is fired at which time it allows exhaust gases to escape from the tube.

The aft ends of rocket launching tubes are normally open or closed at all times, that is, before the rocket is fired, while it is being fired and after the rocket is discharged. Either of these methods has serious objections, particularly when the rocket is launched from a high speed airplane as currently used in military combat. If the aft end is not closed, air flowing through the launching tube produces considerable parasite drag on the plane and also affects the temperature of the rocket. If the aft end is permanently closed the number of rockets that can be fired at one time is limited, due to the thrust of its exhaust gases on the end of its tube which materially affects the flight of an airplane on which the rockets are mounted.

It is, therefore, an object of the present invention to provide a rocket launching tube having automatic valve means which allows rocket exhaust gases to escape to ambient atmosphere but maintains the rocket tube closed to the flow of air therethrough when a rocket is not being fired. This materially reduces the overall drag as the drag due to air flowing through the launching tube is eliminated.

A further object is to provide a rocket launching tube in which temperature of the rocket may be controlled within close limits.

A further object is to provide a rocket launching tube which will permit the firing of a greater number of rockets at one time than if the after end of the rocket tubes were permanently closed.

A further object is to provide a rocket launching tube in which exhaust gases from a fired rocket cannot contact or affect the position of unfired rockets which are arranged to exhaust into a common plenum chamber or duct.

Other objects and advantages of this invention will be apparent from the following description forming a part of the specification, but the invention is not limited to the embodiment herein described, as various forms may be adapted within the scope of the appended claim.

Throughout the specification and claim of the present application, the word "rocket" includes both guided and unguided reaction driven or self propelled missiles.

The invention may be more fully understood by reference to the accompanying drawings, wherein:

Figure 1 is a perspective view of an airplane having rocket launching tubes mounted in wing tip pods in which the valve means of the present invention is incorporated.

Figure 2 is a side elevational view of a rocket in which the valve means of the present invention is incorporated.

Figure 3 is a view of the rocket launching tube viewed from the line 3—3 of Figure 2.

Figure 4:
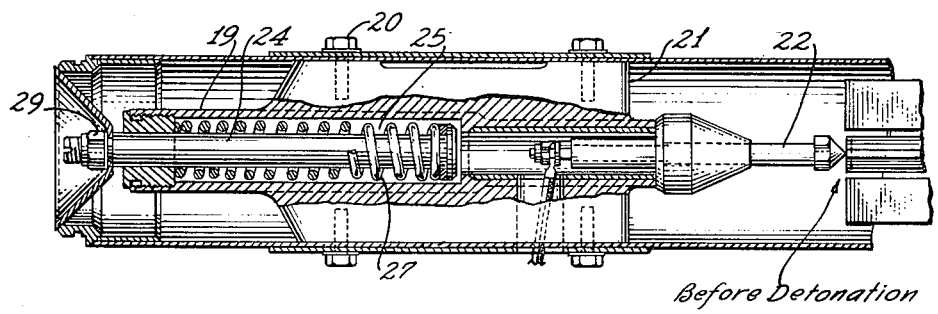
Figure 4 is a fragmentary sectional view of the rocket launching tube taken on the line 4—4 of Figure 3.
Figure 5:
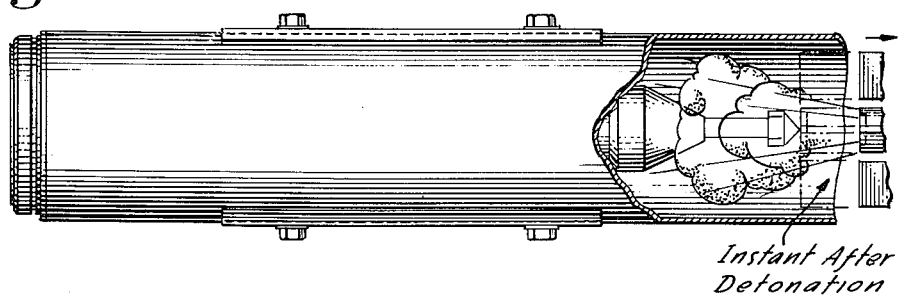
Figure 5 is a fragmentary elevational view of the rocket launching tube partly in section to show its construction.

Referring to Figure 1, a jet driven airplane 1 is fitted with wing tip pods 2, the forward portion 3 being used for mounting rockets while engine fuel is carried in the aft portion 4. The fore and aft portions are separated by a heat resisting bulk-head or firewall 5, the outer surface of the two portions being continuous to provide a streamline surface.

A plurality of rockets 6 and their respective launching tubes 7 are mounted in spaced relation inside the streamline surface of portion 3 of each pod with their axis parallel to the longitudinal axis of the plane and wing tip pod. Rockets may also be mounted in the nose of the airplane, as shown in Figure 1.

When rockets mounted as shown in Figure 1 are fired their exhaust gases are directed laterally to ports 8 where it is exhausted to the atmosphere.

The rocket launching tubes, shown in the present embodiment, comprise a relatively long cylindrical sleeve member 9, open at each end and of slightly larger inside diameter than the rocket which it fires. The member 9 may be considered generally as consisting of two portions, namely, a forward portion in which the rocket is positioned for firing and an aft portion comprising a chamber for exhaust gases and also housing the igniter and exhaust valve mechanism.

A tubular strengthening element 11 is secured, as by spot welding, on the forward outside portion of member 9 and may be provided with circumferentially spaced lightening holes 12 if desired. A conventional electrically heated blanket 13 is also shown as covering a major part of the forward portion of sleeve member 9. Such a blanket provides means for controlling the temperature of a rocket mounted in its launching tube.

A plurality of channel shaped elements 14 provide track means for the rocket. Elements 14 are circumferentially spaced around the inner periphery of member 9 and extend longitudinally of the forward portion thereof with their flanges extending radially inwardly. A bracket 15 provides stop means for the rocket, limiting its rearward movement when it is loaded from the forward end of launching tube 7. The rocket, shown in firing position in Figure 2, is equipped with folding directing vanes 16. The rocket is held in its firing position, during normal operations, by means of a latching device 17 having a detent 18 which is resiliently urged into a circumferential groove in the end portion of the rocket.

Figure 6:
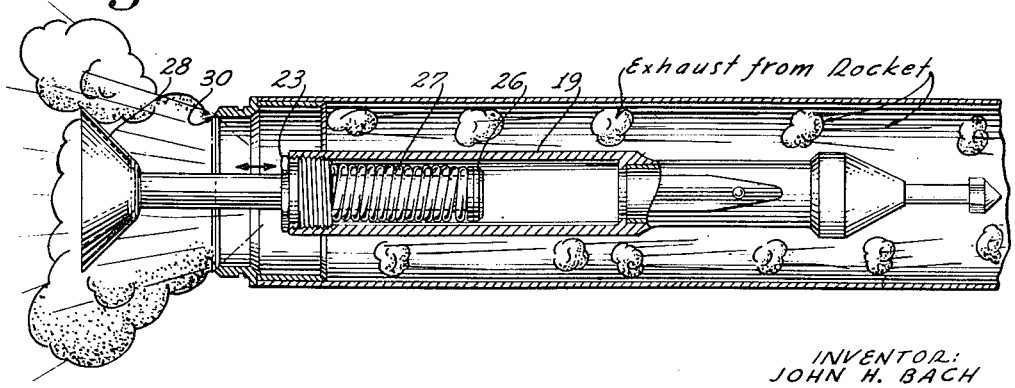
Figure 6 is a fragmentary longitudinal sectional view of the rocket launching tube showing the valve means in its open position.

As best seen in Figures 4 and 6, a hollow cylindrical member 19 extends co-axially of the sleeve member 9 in the exhaust gas chamber, being secured by means of cap screws 20 extending through the wall of the sleeve member and threaded into diametrically opposite leg members 21 formed integral with member 19 extending to the walls of sleeve member 9.

The forward end of member 19 carries a conventional igniter 22 which contacts a firing button associated with the rocket. The particular type of igniter shown forms no part of the present invention and is illustrative only.

The aft end of member 19 is threaded to receive a bushing 23. A circular rod 24 extends through the bushing in sliding relationship therewith and into the hollow cylindrical portion of the member. The end of rod 24, located in hollow portion 25, is provided with an annular shoulder 26 of less diameter than the inside diameter of the hollow portion. Positioned around the rod 24, between annular shoulder 26 and bushing 23, is a helical spring 27. Secured to the other end of rod 24 is a hollow frusto-conical closure element 28 secured to the rod at its small end by means of lock nut 29. The end of sleeve member 9 is formed with a tapering surface which mates with and provides a seat 30 for the outer surface of element 28 in its closed position (Figure 4). Spring 27 is compressed sufficiently to retain element 28 in its closed position except when a rocket is fired. If the launching tube 7 is mounted on an airplane, as in the present disclosure, the spring 27 will retain element 28 in its closed position against the thrust of air as the plane moves forward. Upon firing a rocket the thrust of its exhaust gases acting on element 28 is sufficient to move it from its seat 30 and further compress the spring, as shown in Figure 6. After the exhaust gases have escaped from the chamber in the aft end of member 9 the spring 27, being under extreme compression, will return element 28 to its seat 30. This precludes the flow of air through sleeve member 9 and reduces the overall drag as ambient air can no longer flow through the tube. Legs 21 have a stream line contour and offer very little resistance to the flow of exhaust gases.

Also exhaust gas from a fired rocket does not come in contact with unfired rockets of an installation in which all rockets exhaust into a common plenum chamber, as shown in Figure 1, if each rocket launching tube of the installation is equipped with a poppet valve. If the rocket tubes are mounted as outlined above, but with their aft ends open, exhaust gas from a fired rocket will come in contact with unfired rockets of the group, their exhaust gas providing a forward thrust which may dislodge any unfired rockets from their normal positions, thereby breaking contact with the firing circuit, or the forward thrust may expel the unfired rockets from their respective tubes. However, if the launching tubes are provided with poppet valves exhaust gas cannot contact unfired rockets and yet the tubes will have the advantages of an open end tube at time of firing.

From the above description it will be apparent there is provided efficient and economical valve means closing the aft end of a rocket launching tube except when a rocket is fired. This materially reduces the drag on a rocket launching tube when mounted on a moving airplane as air can not normally flow through the tube. Also the temperature of a rocket may be accurately controlled as it can not come in contact with ambient air.

While in order to comply with the statute, the invention has been described in language more or less specific as to structural features, it is to be understood the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A rocket launching device, comprising: a cylindrical tube having forward and rearward open ends; a frustro-conical closure element mounted in the rear end of said tube in coaxial relation with respect to said tube to move between a closed position precluding the flow of gases through said tube and an open position in which gases may flow through said tube; resilient means normally urging said closure element to said closed position; said closure element being movable to said open position by rocket exhaust gases at such times as a rocket is fired within said tube.

References Cited in the file of this patent

UNITED STATES PATENTS

| | | |
|---|---|---|
| 587,731 | Hammer | Aug. 10, 1897 |
| 652,742 | Bernstein | July 3, 1900 |
| 2,395,435 | Thompson et al. | Feb. 26, 1946 |
| 2,445,423 | Eastman | July 20, 1948 |
| 2,455,101 | Stevens | Nov. 30, 1948 |
| 2,470,120 | Walker | May 17, 1949 |
| 2,489,953 | Burney | Nov. 29, 1949 |

FOREIGN PATENTS

| | | |
|---|---|---|
| 924,013 | France | Mar. 3, 1947 |
| 970,202 | France | June 14, 1950 |